United States Patent
Yang

(10) Patent No.: US 8,297,343 B2
(45) Date of Patent: Oct. 30, 2012

(54) HEAT ABSORBING OR DISSIPATING DEVICE WITH MULTI-PIPE REVERSELY TRANSPORTED TEMPERATURE DIFFERENCE FLUIDS

(76) Inventor: Tai-Her Yang, Dzan-Hwa (TW)

( * ) Notice: Subject to any disclaimer, the term of this patent is extended or adjusted under 35 U.S.C. 154(b) by 568 days.

(21) Appl. No.: 12/285,862

(22) Filed: Oct. 15, 2008

(65) Prior Publication Data
US 2010/0089553 A1 Apr. 15, 2010

(51) Int. Cl.
*F28D 15/00* (2006.01)

(52) U.S. Cl. ......... 165/104.11; 165/104.14; 165/104.21; 165/104.26; 165/104.33

(58) Field of Classification Search ............. 165/104.11, 165/104.14, 104.21, 104.26, 104.33
See application file for complete search history.

(56) References Cited

U.S. PATENT DOCUMENTS

| | | | | |
|---|---|---|---|---|
| 2,626,130 A * | 1/1953 | Raskin | ......................... | 165/169 |
| 2,911,513 A * | 11/1959 | MacCracken | ............ | 165/104.11 |
| 3,035,419 A * | 5/1962 | Wigert | ..................... | 165/104.21 |
| 3,053,514 A * | 9/1962 | Grenell | ........................ | 165/170 |
| 4,120,284 A * | 10/1978 | Cotsworth et al. | ............ | 165/171 |
| 4,158,354 A * | 6/1979 | Carden | .................... | 165/104.21 |
| 4,182,409 A * | 1/1980 | Robinson, Jr. | ............ | 165/104.21 |
| 4,219,076 A * | 8/1980 | Robinson, Jr. | ............ | 165/104.11 |
| 4,235,287 A * | 11/1980 | Kleine et al. | ................ | 165/170 |
| 4,240,405 A * | 12/1980 | French | ..................... | 165/104.27 |
| 4,257,556 A * | 3/1981 | Skala | ........................ | 165/104.14 |
| 4,279,227 A * | 7/1981 | Skala | ........................ | 123/179.21 |
| 4,299,275 A * | 11/1981 | Robinson, Jr. | ............ | 165/104.14 |
| 4,421,100 A * | 12/1983 | Yu | .................................. | 126/618 |
| 4,466,256 A * | 8/1984 | MacCracken | ................... | 165/45 |
| D280,544 S * | 9/1985 | Fukumoto | ..................... | D23/386 |
| D280,545 S * | 9/1985 | Fukumoto | ..................... | D23/386 |
| 4,614,091 A * | 9/1986 | Frank et al. | .............. | 165/104.21 |
| 4,712,158 A * | 12/1987 | Kikuchi et al. | ................ | 361/699 |
| 4,827,735 A * | 5/1989 | Foley | .............................. | 62/430 |
| 4,901,789 A * | 2/1990 | Hengelmolen | .................... | 165/4 |
| 4,921,041 A * | 5/1990 | Akachi | ..................... | 165/104.26 |
| 5,219,020 A * | 6/1993 | Akachi | ..................... | 165/104.26 |
| 5,695,004 A * | 12/1997 | Beckwith | ................. | 165/104.21 |
| 6,101,821 A * | 8/2000 | Cates | .............................. | 62/139 |
| 6,220,337 B1 * | 4/2001 | Chen et al. | ...................... | 165/10 |
| 6,860,320 B2 * | 3/2005 | Johnson et al. | ................. | 165/45 |
| 6,889,753 B2 * | 5/2005 | Takamizawa et al. | ... | 165/104.21 |
| 6,889,754 B2 * | 5/2005 | Kroliczek et al. | ........ | 165/104.26 |
| 7,000,684 B2 * | 2/2006 | Kenny et al. | .............. | 165/104.21 |
| 7,004,240 B1 * | 2/2006 | Kroliczek et al. | ........ | 165/104.11 |
| 7,218,519 B2 * | 5/2007 | Prasher et al. | ............ | 165/104.33 |
| 7,372,697 B2 * | 5/2008 | Tomioka | ....................... | 361/699 |
| 7,650,932 B2 * | 1/2010 | Li | .............................. | 165/104.33 |
| 7,905,110 B2 * | 3/2011 | Reich et al. | ...................... | 165/10 |
| 8,109,324 B2 * | 2/2012 | Farid et al. | .............. | 165/104.33 |
| 2007/0034356 A1 * | 2/2007 | Kenny et al. | ............. | 165/104.33 |

* cited by examiner

*Primary Examiner* — Ljiljana Ciric
(74) *Attorney, Agent, or Firm* — Bacon & Thomas, PLLC

(57) ABSTRACT

A heat absorbing or dissipating device has a multi-pipe arrangement for flowing thermal conductive fluids having a temperature difference. The thermal conductive fluids are reversely transported by a first fluid piping and second fluid piping of the multi-pipe arrangement and configured in way such that the piping has a parallel arrangement on a same end side of a heat dissipation or absorption receiving article or space.

12 Claims, 4 Drawing Sheets

HEAT ABSORBING OR DISSIPATING DEVICE WITH MULTI-PIPE REVERSELY TRANSPORTED TEMPERATURE DIFFERENCE FLUIDS

BACKGROUND OF THE INVENTION (a) Field of the Invention

The present invention discloses a device having a multi-pipe structure configured to pass thermal conductive fluids in reverse flow directions to allow heat absorption or heat dissipation. More specifically, the multi-pipe system is disposed with at least one passage of the first fluid piping and at least one passage of the second fluid piping in parallel or quasi-parallel arrangement, wherein the first fluid piping and the second fluid piping is arranged for transporting the thermal conductive fluids constituted by gaseous or liquid state fluid, gaseous to liquid state fluid or liquid to gaseous state fluid in temperature difference to the passive heat dissipation or absorption receiving article or space in mutually reverse directions. This arrangement produces a heat absorbing or dissipating function onto the passive heat dissipation or absorption receiving article or space thereby forming a more uniform temperature distribution status on the passive heat dissipation or absorption receiving article or space.

(b) Description of the Prior Art

For the conventional heat absorbing or dissipating devices that pass thermal conductive fluid as the heat absorbing or dissipating body constituted by gaseous or liquid state fluid, gaseous to liquid state fluid, or liquid to gaseous state fluid, such as engine cooling water radiators, heat absorbing cooling energy discharge devices utilizing thermal conductive fluid, or heat dissipating warming energy discharge devices such as warming devices, heaters, or the warming energy transfer device, etc., as the flow direction of the thermal conductive fluid is fixed, a larger temperature difference is formed at each position on the heat absorbing or dissipating body of the thermal conductive fluid.

SUMMARY OF THE INVENTION

The present invention discloses an improvement to the conventional heat transfer devices using thermal conductive fluid in fixed flow direction as the heat absorbing or dissipating body for heat absorption or dissipation by using a first fluid piping and a second fluid piping in parallel or quasi-parallel arrangement. The first fluid piping and the second fluid piping is arranged for transporting the thermal conductive fluids constituted by gaseous or liquid state fluid, gaseous to liquid state fluid or liquid to gaseous state fluid having a temperature difference compared to a passive heat dissipation or absorption receiving article or space, in mutually reverse directions. When transporting the thermal conductive fluids, a heat absorption or dissipation function is performed on the passive heat dissipation or absorption receiving article or space to create a more uniform temperature distribution.

DESCRIPTION OF MAIN COMPONENT SYMBOLS

Figure 1:
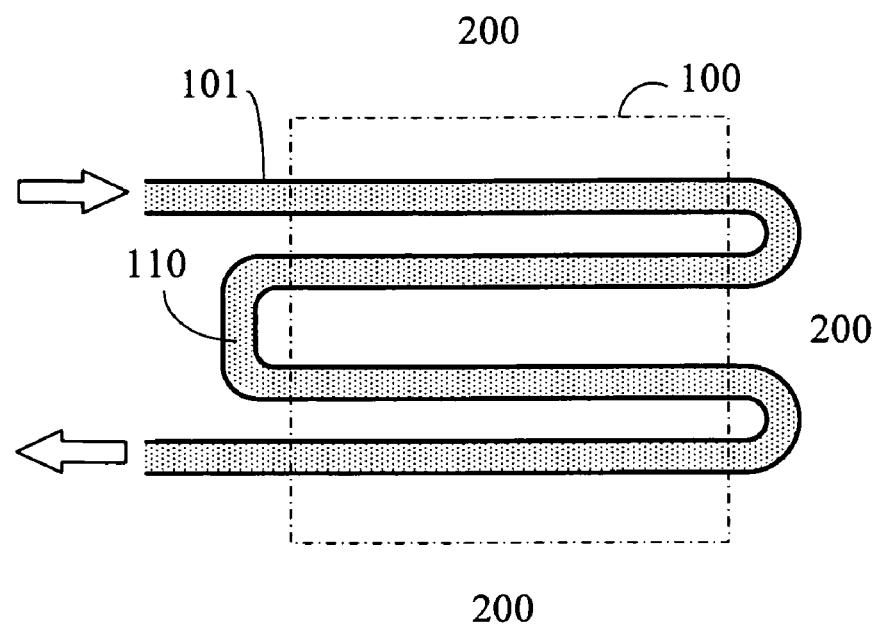
FIG. 1 is a main structural schematic view of a heat absorbing or dissipating device for being passed through by thermal conductive fluid at fixed flow direction being constituted by conventional heat absorbing or dissipating gaseous or liquid state fluid or gaseous to liquid state fluid, or liquid to gaseous state fluid, etc.

100: Heat absorbing or dissipating body
101: First fluid piping
102: Second fluid piping
105: Inlet manifold
106: Outlet manifold
110: Thermal conductive fluid
111: First fluid outlet
112: First fluid inlet
121: Second fluid outlet
122: Second fluid inlet
200: Passive heat dissipation or absorption receiving article in solid, or colloid, or liquid, or gaseous state or space

DETAILED DESCRIPTION OF THE PREFERRED EMBODIMENTS

FIG. 1 is a structural schematic view of a heat absorbing or dissipating device for passing through thermal conductive fluids at fixed flow direction having conventional heat absorbing or dissipating gaseous or liquid state fluid or gaseous to liquid state fluid, or liquid to gaseous state fluid, etc. The thermal conductive fluid (110), which can be a gaseous or liquid state fluid, or gaseous to liquid state fluid, or liquid to gaseous state fluid, etc., is passed through the first fluid piping (101) to thermally contact the heat absorbing or dissipating assembly constituted by the heat absorbing or dissipating body (100). This configuration allows: 1) the passing through of the thermal conductive fluid (110) in the first fluid piping (101) to perform cooling or heating functions by transferring the heating or cooling energy of the thermal conductive fluid through the heat absorbing or dissipating body (100) to the passive heat dissipation or absorption receiving solid, or colloid, or liquid, or gaseous state article or space (200); or 2) the passing through of the thermal conductive fluid (110) in the first fluid piping (101) to reversely absorb the surrounding cooling or heating energy of the heat absorbing or dissipating body (100). The first configuration is often applied in engine cooling water radiators, heat absorbing cooling energy discharge devices utilizing thermal conductive fluid (110), or heat dissipating warming energy discharge devices such as warming devices, heaters, evaporators, condensers, or the cooling or warming energy transfer device, etc. In this application, thermal conductive fluid (110) is inputted via the inlet of the first fluid piping (101) at one side end of the heat absorbing or dissipating body (100) and outputted via another side end to form a larger temperature difference between the inlet and outlet of the thermal conductive fluids (110) of the first fluid piping (101) of the heat absorbing or dissipating body (100). The second configuration is often applied in cooling or warming energy transfer devices. In this application, the second configuration will form a larger temperature difference between the inlet and outlet of the thermal conductive fluids (110) of the first fluid piping (101) of the heat absorbing or dissipating body (100). These configurations have the defects of the conventional heat absorbing or dissipating device.

Figure 2:
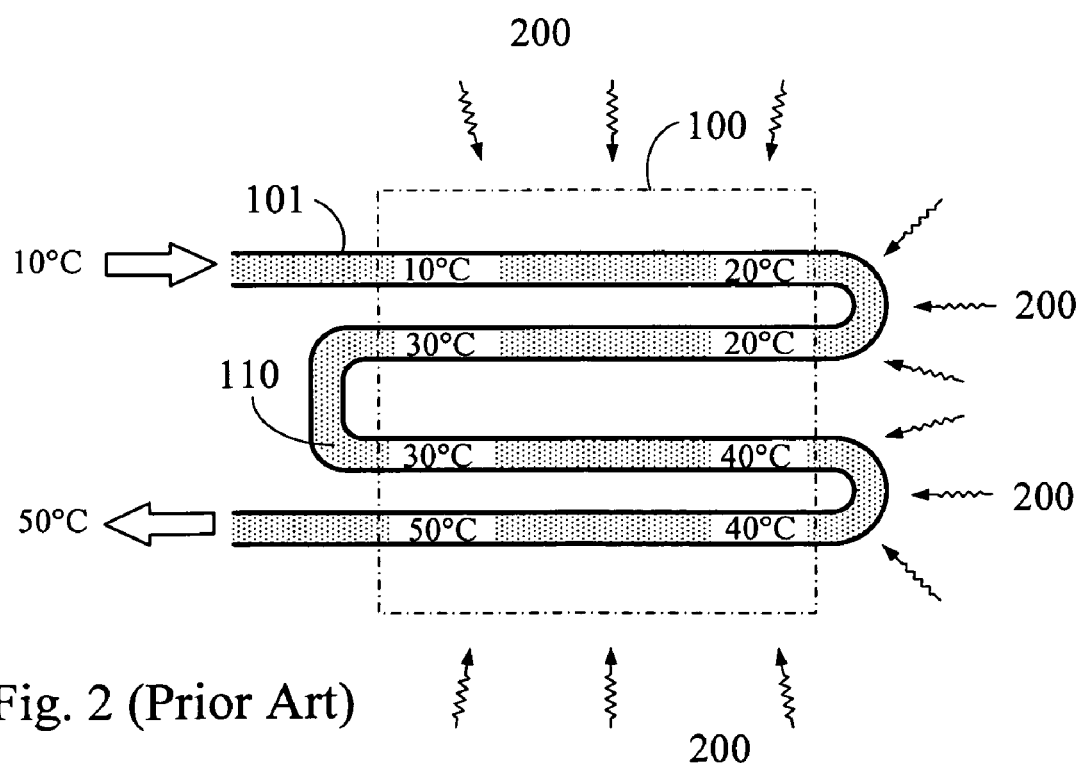
FIG. 2 is a temperature difference distribution diagram of FIG. 1 being operated for the heat absorbing cooling energy discharge device function.

FIG. 2 is a temperature difference distribution diagram of FIG. 1 where the heat absorbing or dissipating body (100) has a warming function by providing heating energy to the thermal conductive fluid. FIG. 2 shows the thermal conductive fluid (110) flowing in a fixed flow direction as shown in FIG. 1 operated as having a conventional heat dissipating function where warming energy is absorbed by the thermal conductive fluid. The thermal conductive fluid flows in the piping having an unidirectional flow path, wherein when the thermal conductive fluid (110) passes through the first fluid piping (101), a larger difference in the temperature distribution forms between the inlet and outlet of the thermal conductive fluids (110) of the heat absorbing or dissipating body (100). In other words, as seen in FIG. 2, the temperature at the inlet of the thermal conductive fluid is 10° C. and progressively increases to an outlet temperature of 50° C. Similarly, the temperature of the heat absorbing or dissipating body (100) has a similar temperature distribution where a first end, e.g., an inlet position, has a temperature significantly lower than at a second end, e.g., an outlet position. This creates a non-uniform temperature distribution within the heat absorbing or dissipating body (100).

Figure 3:
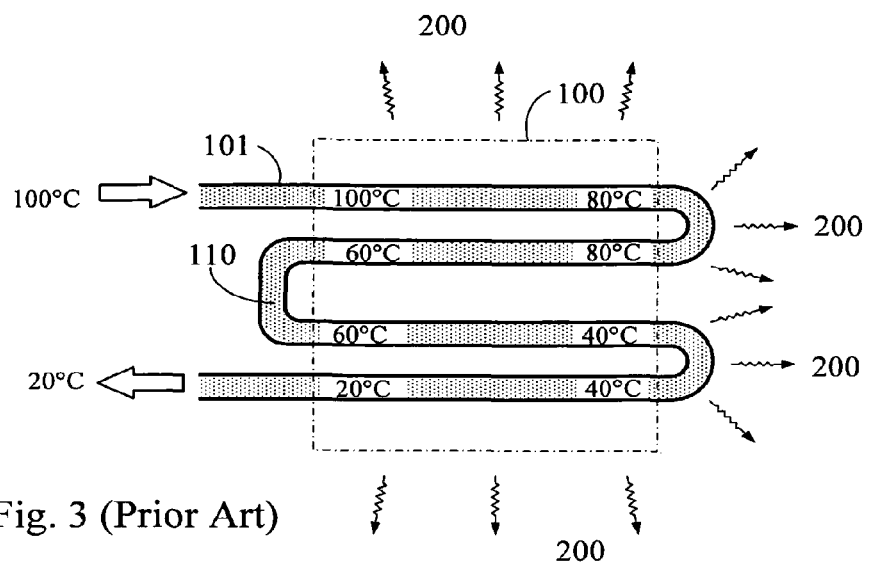
FIG. 3 is a temperature difference distribution diagram of FIG. 1 being operated for the heat dissipating warming energy discharge device function.

FIG. 3 is a temperature difference distribution diagram of FIG. 1 having a heat dissipating function by using a device that absorbs warming energy. FIG. 3 shows the thermal conductive fluid (110) flowing in fixed flow direction as shown in FIG. 1 having an unidirectional flow path. The thermal conductive fluid flows in a conventional heat absorbing device that transfers heating energy to the heat absorbing or dissipating body (100) thus cooling the thermal conductive fluid. When the thermal conductive fluid (110) passes through the first fluid piping (101), a large temperature difference distribution occurs between the inlet and outlet of the thermal conductive fluid (110) of the heat absorbing or dissipating body (100). As seen in FIG. 3, the temperature of the thermal conductive fluid at the inlet of the heat absorbing or dissipating body is at 100° C., while the temperature of the thermal conductive fluid at the outlet of the heat absorbing or dissipating body is at 20° C. Since the temperature of the thermal conductive fluid is significantly higher at the inlet of the heat absorbing or dissipating body, the thermal distribution profile of the heat absorbing or dissipating body similarly has a large difference in temperature at the inlet and outlet positions, i.e., the inlet side is hotter than the outlet side.

The present invention improves over the above temperature distribution phenomenon by innovatively disclosing a device that passes thermal conductive fluids for heat absorption or dissipation using a method that pumps thermal conductive fluids in a multi-pipe structure in reverse directions to produce a heat absorbing or dissipating function to a passive heat dissipation or absorption receiving article or space. This allows the heat absorbing or dissipating thermal conductive fluid to have a more uniform temperature distribution profile.

Figure 4:
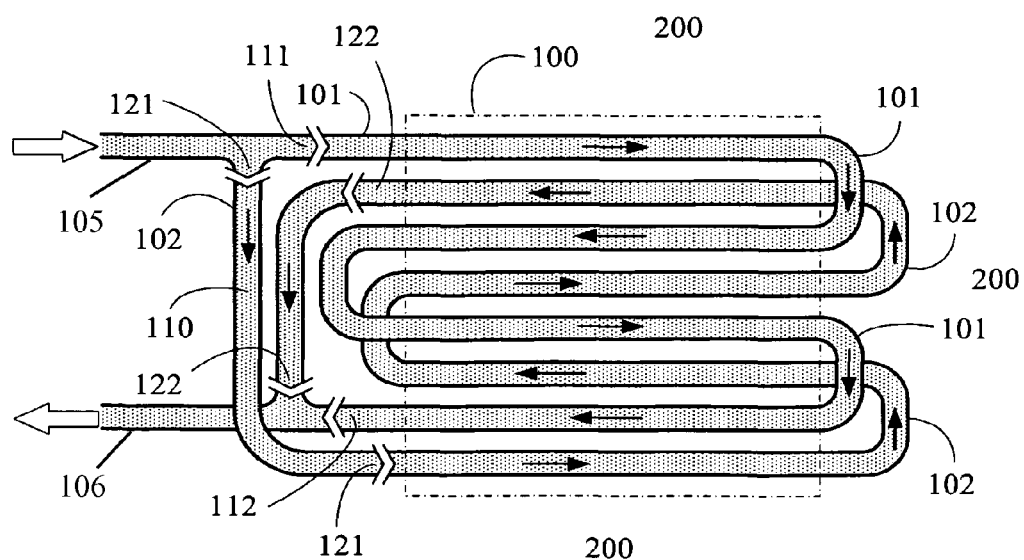
FIG. 4 is a main structural schematic view of the heat absorbing or dissipating device with multi-pipe reversely transported temperature difference fluids of the present invention.

FIG. 4 is a main structural schematic view of the heat absorbing or dissipating device with a multi-pipe structure configured in a way to allow reversely transporting the temperature difference fluids of the present invention. The assembly structure of the heat absorbing or dissipating device mainly comprises the following:

A heat absorbing or dissipating body (100) made of thermal conductive material made from a solid, or colloid, or liquid, or gaseous state that receives the thermal energy of the thermal conductive fluid (110). The thermal conductive fluid can be in a gaseous or liquid state, or can change from a gas to liquid state, or liquid to gas state inside the first fluid piping (101) and the second fluid piping (102) to perform a heat absorbing function by absorbing warming energy or a heat dissipating function by releasing warming energy to the passive heat dissipation or absorption receiving article or space (200). Additionally, there can be one or more than one of the heat absorbing or dissipating bodies (100).

A first fluid piping (101) and a the second fluid piping (102) are made of thermal conductive material to allow the reverse passing of the thermal conductive fluid (110) for transferring thermal energy to the heat absorbing or dissipating body (100). The first fluid piping (101) and the second fluid piping (102) can have one or more than one passage.

An inlet manifold 105 having a first fluid outlet (111) is connected to the first fluid piping (101) in parallel with a second fluid outlet (121) of the inlet manifold connected to the second fluid piping (102) to receive the inflow of the thermal conductive fluid (110) and the first fluid inlet (112) of an outlet manifold 106 is connected to the first fluid piping (101) in parallel with the second fluid inlet (122) of the outlet manifold connected to the second fluid piping (102) to receive the outflow of the thermal conductive fluid (110).

The first fluid piping (101) and the second fluid piping (102) are arranged to form a first and second circuit within the heat absorbing or dissipating device in a parallel or quasi-parallel configuration having a planar structure or three-dimensional structure in the heat absorbing or dissipating body (100). This structure is characterized as having the first fluid outlet (111) and the second fluid inlet (122) installed at adjacent locations to the heat absorbing or dissipating body (100), while the first fluid inlet (112) and the second fluid outlet (121) are installed at another adjacent location on the heat absorbing or dissipating body (100). In other words, the first fluid outlet is arranged on an opposite end of a first side of the heat absorbing or dissipating body than the second fluid outlet of the inlet manifold and the first fluid inlet is arranged on an opposite side of the first side of the heat absorbing or dissipating body than the second fluid inlet of the outlet manifold. This configuration allows the thermal conductive fluids (110) to flow in two circuits inside the first fluid piping (101) and the second fluid piping (102) installed on the heat absorbing or dissipating body (100) to transport the fluids in reverse directions to commonly allow a more uniform temperature distribution in the heat absorbing or dissipating body (100) for performing the heat absorbing or dissipating function to the passive heat dissipation or absorption receiving solid, or colloid, or liquid, or gaseous state article or space (200). In other words, the flow of the thermal conductive fluid through the first and second circuits is arranged so that the thermal conductive fluid is flowable in the heat absorbing or dissipating body such that the flow through the at least one first circuit is in one direction and the flow in the at least one second circuit is in a parallel and opposite direction to the one direction.

The structural relationships between the heat absorbing or dissipating body (100), the first fluid piping (101), and the second fluid piping (102) as shown in FIG. 4 can be described as having one or more of the following relationships:

(1) The heat absorbing or dissipating body (100) a has an assembled structure with at least one of the first fluid piping (101) and the second fluid piping (102); or (2) The heat absorbing or dissipating body (100) has an integral structure with at least one of the first fluid piping (101) and the second fluid piping (102); or (3) The function of the heat absorbing or dissipating body (100) is directly provided with at least one of the first fluid piping (101) and the second fluid piping (102) to absorb or dissipate heat onto the passive heat dissipation or absorption receiving article or space (200) without disposing the heat absorbing or dissipating body (100).

Figure 5:
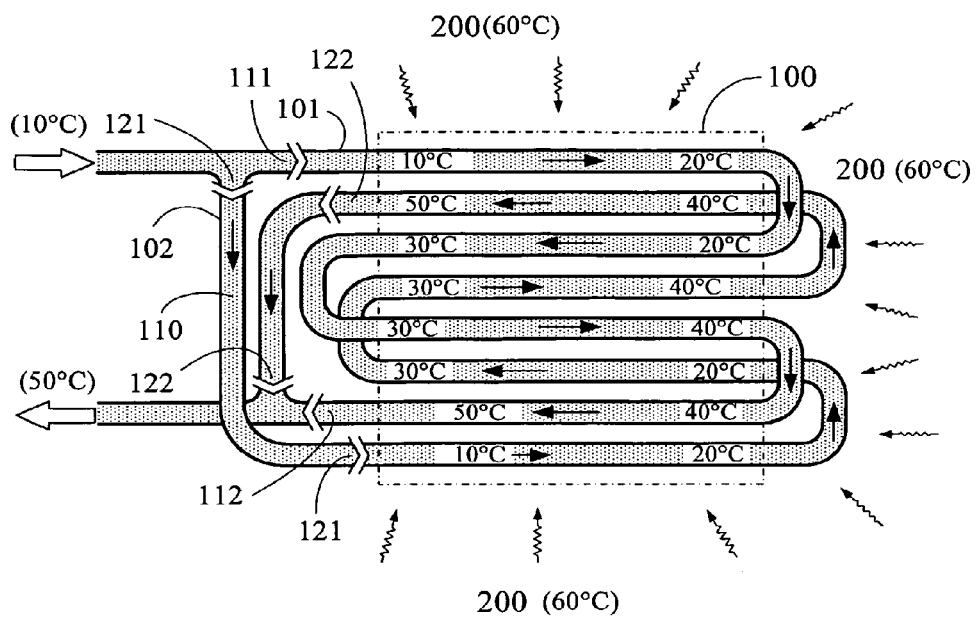
FIG. 5 is a temperature difference distribution diagram formed on the structure shown in FIG. 4 being operated for heat absorbing cooling energy discharge device function.

FIG. 5 is a temperature difference distribution diagram of the structure shown in FIG. 4 where the thermal conductive fluid absorbs warming energy from the heat absorbing or dissipating body (100) or the passive heat dissipation or absorption receiving article or space (200). As shown in FIG. 5, in the heat absorbing or dissipating body (100), the first fluid outlet (111) of the inlet manifold 105 and the second fluid inlet (122) of the outlet manifold 106 are installed in adjacent first positions. While the first fluid inlet (112) of the outlet manifold 106 and the second fluid outlet (121) of the inlet manifold 105 are installed in adjacent second positions at another location. These configurations allow the transporting of the thermal conductive fluids (110) in the two circuits in reverse directions, wherein the input flow of the thermal conductive fluid (110) has a lower temperature, while the output flow of the thermal conductive fluid (110) has a higher temperature, and the heat absorbing or dissipating body (100) has an intermediate temperature above the temperatures of the input and output flows of the thermal conductive fluid (110). However, the heat absorbing or dissipating body (100) has a more uniformly distributed temperature distribution resulting from absorbing or dissipating the heating and cooling energy onto the passive heat dissipation or absorption receiving article or space (200) to avoid localized low temperatures.

Figure 6:
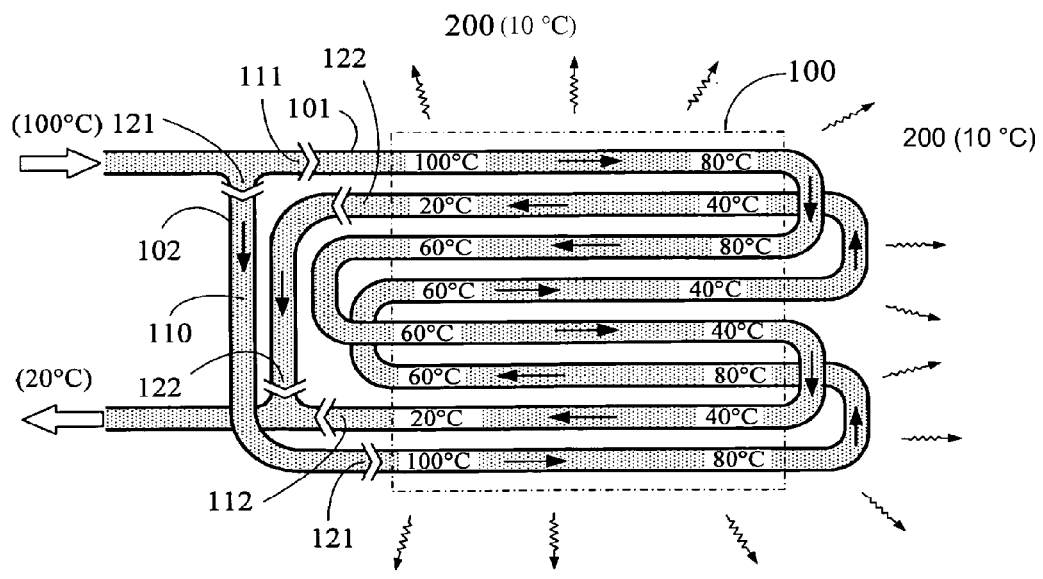
FIG. 6 is a temperature difference distribution diagram formed on the structure shown in FIG. 4 being operated for heat dissipating warming energy discharge device function.

FIG. 6 is a temperature difference distribution diagram of the structure shown in FIG. 4 configured in way to allow for heat dissipation of the warming energy. As shown in FIG. 6, in the heat absorbing or dissipating body (100), the first fluid outlet (111) of the inlet manifold 105 and the second fluid inlet (122) of the outlet manifold 106 are installed in adjacent first positions, while the first fluid inlet (112) of the outlet manifold 106 and the second fluid outlet (121) of the inlet manifold are installed in adjacent second positions at another location. These configurations allow the transportation of the thermal conductive fluid (100) in the two circuits in reverse directions. The input flow of the thermal conductive fluid (110) has a higher temperature, while the output flow of the thermal conductive fluid (110) has a lower temperature, and the heat absorbing or dissipating body (100) has an intermediate temperature below the temperatures of the input and output flows of the thermal conductive fluid (110). However, the heat absorbing or dissipating body (100) has a more uniformly distributed temperature distribution resulting from the heat dissipating and absorbing of warming energy onto the passive heat dissipation or absorption receiving article or space (200) to avoid localized high temperatures.

Figure 7:
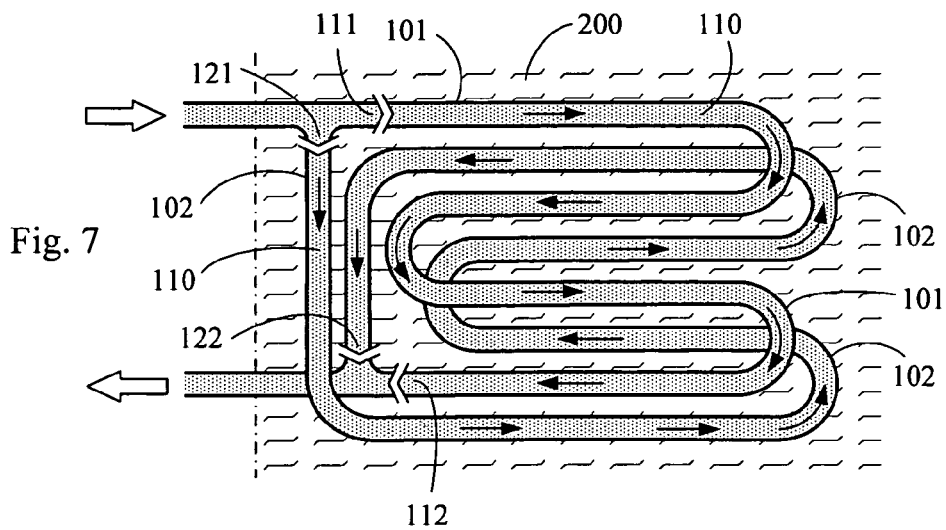
FIG. 7 is a main structural schematic view of the structure shown in FIG. 4 showing that the first fluid piping and the second fluid piping for directly reversely transporting thermal conductive fluids in temperature difference by multi-pipe directly constitute the common structural body and directly transfer thermal energy onto the passive heat dissipation or absorption receiving article or space.

In the heat absorbing or dissipating device having the multi-pipe system for reversely transporting thermal conductive fluids having a temperature difference, the first fluid piping (101) and the second fluid piping (102) can be arranged to have a parallel or quasi-parallel distribution in a planar structure or three-dimensional structure to form said structural body. The first fluid piping (101) and the second fluid piping (102) are arranged to directly reversely transport the thermal conductive fluid (110) from the same end side thereby allowing the first fluid piping (101) and the second fluid piping (102) to directly transfer a heat dissipating function by thermally transferring warming energy or heat absorbing function by thermally transferring cooling energy on the passive heat dissipating or absorption receiving article or space. FIG. 7 is a main structural schematic view of the structure shown in FIG. 4 showing the first fluid piping and the second fluid piping for directly reversely transporting thermal conductive fluids to achieve a temperature difference using a multi-pipe system as the structural body and directly transferring thermal energy to the passive heat dissipation or absorption receiving article or space. The structure of FIG. 7 has the following features:

A first fluid piping (101) and the second fluid piping (102) made of thermal conductive material that form the common structural body for transferring thermal energy through the thermal conductive fluid (110), wherein the first fluid piping (101) and the second fluid piping (102) can have one or more flow circuits. The first fluid outlet (111) of the inlet manifold 105 is connected in parallel with the second fluid outlet (121) of the inlet manifold 105 to receive inflow of the thermal conductive fluid (110), and the first fluid inlet (112) of the outlet manifold 106 is connected in parallel with the second fluid inlet (122) of the outlet manifold 106 to receive outflow of the thermal conductive fluid (110). The first fluid piping (101) and the second fluid piping (102) are configured so that they have a parallel or quasi-parallel distribution in a planar structure or three-dimensional structure to form the common structural body. The first fluid outlet (111) and the second fluid inlet (122) are installed at an adjacent first location that is common to their position in the structural body, while the first fluid inlet (112) and the second fluid outlet (121) are installed on a second adjacent location at another location that is common to their position in the structural body. The first fluid piping (101) and the second fluid piping (102) of the multiple piping structure forming the common structural body is configured in a way so that the two circuits transport the thermal conductive fluid (110) in reverse directions to more uniformly distribute the temperature in the passive heat dissipation or absorption receiving article or space (200) when absorbing the heating energy or dissipating the heating energy onto the passive heat dissipation or absorption receiving article or space (200).

For the heat absorbing or dissipating device having the multi-pipe structure for reversely transporting temperature difference fluids of the present invention, the structural relationships between the passive heat dissipation or absorption receiving article or space (200), the first fluid piping (101) and the second fluid piping (102) include the following features: the function of the heat absorbing or dissipating body (100) is provided by at least one of the first fluid piping (101) and the second fluid piping (102) to perform the heat absorption or dissipation onto the passive heat dissipation or absorption receiving article or space (200), or the first fluid piping and the second fluid piping forming the multi-pipe structure configured in a way to allow the reverse flow of the thermal conductive fluids to form the common structural body and directly transfer thermal energy onto the passive heat dissipation or absorption receiving article or space (200).

Figure 8:
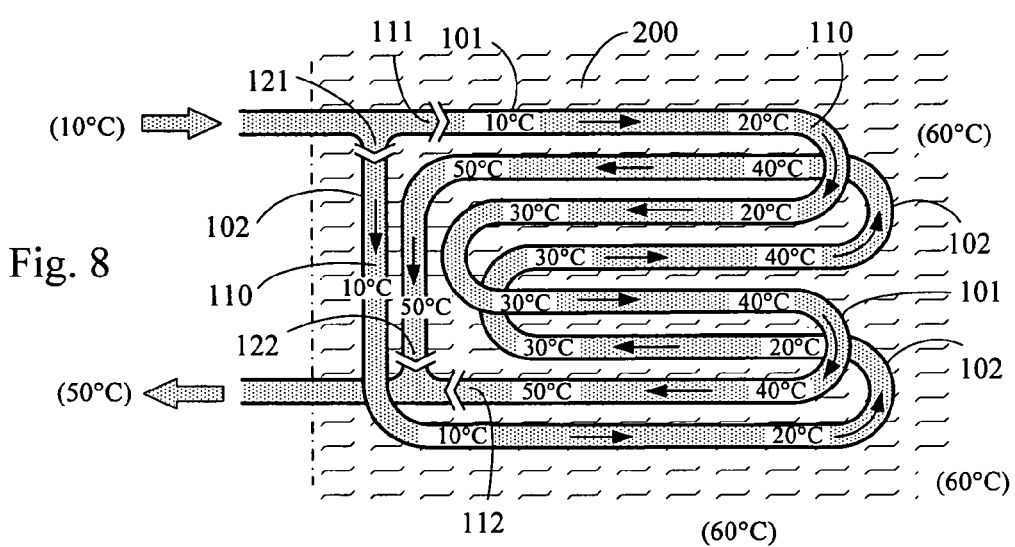
FIG. 8 is a temperature difference distribution diagram formed on the structure shown in FIG. 7 being operated for heat absorbing cooling energy discharge device function.

FIG. 8 is a temperature difference distribution diagram of the structure shown in FIG. 7 where the thermal conductive fluid absorbs warming energy from the heat absorbing or dissipating body (100) or the passive heat dissipation or absorption receiving article or space. As shown in FIG. 8, in the structural body as shown in the structure of FIG. 7, the first fluid outlet (111) of the inlet manifold 105 and the second fluid inlet (122) of the outlet manifold 106 are installed in adjacent first positions, while the first fluid inlet (112) of the outlet manifold 106 and the second fluid outlet (121) of the inlet manifold 105 are installed in adjacent second positions at another location for transporting the thermal conductive fluid (110) in the two circuits in reverse directions, wherein the input flow of the thermal conductive fluid (110) has a lower temperature, while the output flow of the thermal conductive fluid (110) has a higher temperature, and the common structural body has an intermediate temperature above the temperatures of the input and output flows of the thermal conductive fluids (110). This configuration has a more uniformly distributed temperature distribution in the passive heat dissipation or absorption receiving article or space (200) to perform heat absorbing and cooling energy transfer onto the passive heat dissipation or absorption receiving article in solid, or colloid, or liquid, or gaseous state or space (200) thereby avoiding localized low temperatures.

Figure 9:
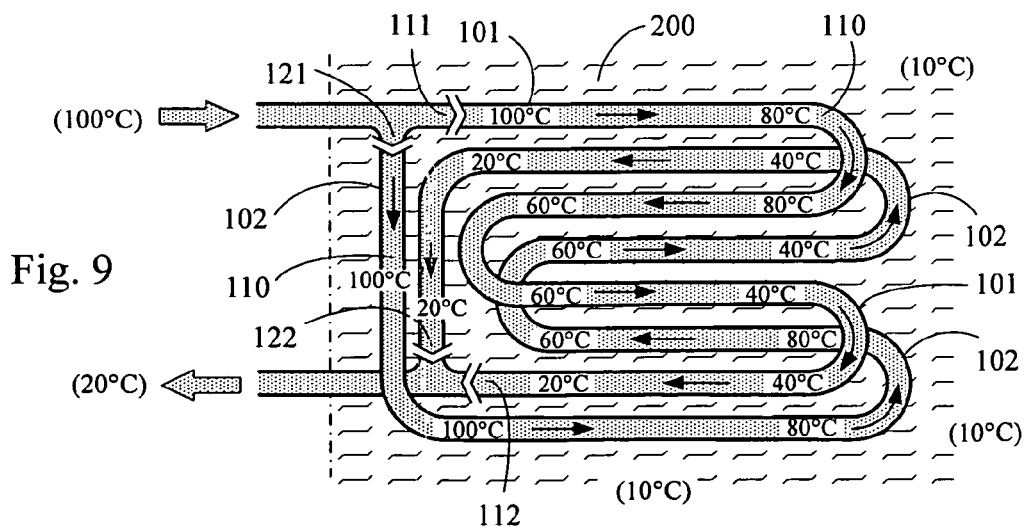
FIG. 9 is a temperature difference distribution diagram formed on the structure shown in FIG. 7 being operated for heat dissipating warming energy discharge device function.

FIG. 9 is a temperature difference distribution diagram of the structure shown in FIG. 7 where the thermal conductive fluid dissipates warming energy to the heat absorbing or dissipating body (100) or the passive heat dissipation of absorption receiving article or space (200). As shown in FIG. 9, in the common structural body as shown in the structure of FIG. 7, the first fluid outlet (111) and the second fluid inlet (122) are installed at a first adjacent position, while the first fluid inlet (112) and the second fluid outlet (121) are installed at a second adjacent position at another location for transporting the thermal conductive fluid (110) in the two circuits in reverse directions. The input flow of the thermal conductive fluid (110) is at a higher temperature, while the output flow of the thermal conductive fluid (110) is at lower temperature, and the common structural body has an intermediate temperature below the temperatures of the input and output flows of thermal conductive fluids (110). This configuration has a more uniform temperature distribution in the passive heat dissipation or absorption receiving article or space (200) to perform the heat dissipation and heat absorption with the passive heat dissipation or absorption receiving article or space (200) thereby avoiding localized high temperatures.

For applications of the heat absorbing or dissipating device with multi-pipe structure configured to allow a reverse flow of the temperature difference fluids can have one or more of the following methods based on the aforesaid operating principles according to structural needs of the application and cost considerations. The following designs include:

For a heat absorbing or dissipating device having a multi-pipe structure configured in a way such that the temperature difference fluids can be transported by flowing in a reverse direction, the first fluid piping (101) and the second fluid piping (102) can be configured to have an integral piping structure integrally formed with the structure of the heat absorbing or dissipating body (100);

For a heat absorbing or dissipating device having a multi-pipe structure configured in a way such that the temperature difference fluids can be transported by flowing in a reverse direction, three piping structures of the first fluid piping (101), second fluid piping (102) and heat absorbing or dissipating body (100) can have an assembled structure; or For a heat absorbing or dissipating device having a multi-pipe structure configured in a way such that the temperature difference fluids can be transported by flowing in a reverse direction, the heat absorbing or dissipating body (100) can have a single structural body, e.g., plate, block, or multi-fins shape, or the structural unit assembled by fins, or can have at least one structural unit;

For a heat absorbing or dissipating device having a multi-pipe structure configured in a way such that the temperature difference fluids can be transported by flowing in a reverse direction, the three piping structure of the heat absorbing or dissipating body (100) made from a solid, or colloid, or liquid, or gaseous state thermal conductive material, the first fluid piping (101) and the second fluid piping (102) can be partly or completely made to various geometric shapes without changing the working thermal heat transferring principles;

For a heat absorbing or dissipating device having a multi-pipe structure configured in a way such that the temperature difference fluids can be transported by flowing in a reverse direction, the thermal conductive fluid (110) is a gaseous or liquid state fluid, gaseous to liquid state fluid, or liquid to gaseous state fluid;

For a heat absorbing or dissipating device having a multi-pipe structure configured in a way such that the temperature difference fluids can be transported by flowing in a reverse direction, the thermal conductive fluid (110) passing through the first fluid piping (101) and the second fluid piping (102) can be transported by pumping, evaporation, or heat-cold natural circulation;

For a heat absorbing or dissipating device having a multi-pipe structure configured in a way such that the temperature difference fluids can be transported by flowing in a reverse direction, the warming or cooling energy is discharged to the liquid state passively to a heat dissipation or absorption receiving article or space (200) by using a flow that results naturally from a cold-heat circulation of fluid having a temperature difference or forced fluid pumping to generate a thermal transfer function of heat convention, radiation or conduction; or the warming or cooling energy is discharged to the solid or colloidal or liquid or gaseous state passive heat dissipation or absorption receiving article or space (200) through conduction;

For a heat absorbing or dissipating device having a multi-pipe structure configured in a way such that the temperature difference fluids can be transported by flowing in a reverse direction, the thermal conductive fluid (110) passing through the first fluid piping (101) and the second fluid piping (102) is circulated through a closed-loop structure or released by an open-loop structure.

The heat absorbing or dissipating device having a multi-pipe structure configured in a way such that the temperature difference fluids can be transported by flowing in a reverse direction of the present invention can be used for various heat absorbing, or dissipating, or cooling heat conducting application devices. For example, the heat absorbing or dissipating device can be used for cooling water radiators of an engine, heat absorbing cooling energy discharge devices using thermal conductive fluid, or heat dissipating warming energy discharge device using thermal conductive fluid such as thermal energy, heater or thermal energy transfer devices for warming equipments, or heating or cooling for ceilings, walls or floors of the buildings, or cooling of photovoltaic panels, or heating or cooling for electrical machine or power machineries, or heat absorption and dissipation of various machine casings, heat pipe structures, structure casings, various chips or semiconductor components, ventilation devices, or the heat absorption, heat dissipation or thermal energy transfer of information, audio or image devices, or heat dissipation of various lamp or LED devices, or the heat absorption of the evaporator or heat dissipation or thermal energy transfer of condensers of air conditioning devices, or thermal energy transfer of mechanical devices, or heat dissipation of frictional heat loss, or heat dissipation or thermal energy transfer of electric heater or other electric heating home appliances or cooking devices, or heat absorption or thermal energy transfer of flame heating stoves or cooking devices, or heat absorption, heat dissipation or thermal energy transfer of earth layer or water thermal energy, plant or housing building or building material or building structure devices, heat absorbing or dissipation of water tower, or heat absorption, heat dissipation or thermal energy transfer of batteries of fuel cells, etc.

Additionally, the structure can be used for thermal energy transfer applications in home appliances, industrial products, electronic products, electrical machines or mechanical devices, power generation equipments, buildings, air conditioning devices, industrial equipments or industrial manufacturing process.

The invention claimed is:

1. A heat absorbing or dissipating device comprising:
a passive heat dissipation or absorption receiving article or space having at least one heat absorbing or dissipating body having a first side, wherein the heat absorbing or dissipating body has an inlet manifold having a first and second outlet on opposite ends of the first side and an outlet manifold having a first and second inlet on opposite ends of the first side of the heat absorbing or dissipating body;
at least one first fluid piping coupled to the first outlet of the inlet manifold and to the first inlet of the outlet manifold to form at least one first circuit within the heat absorbing or dissipating body;
at least one second fluid piping coupled to the second outlet of the inlet manifold and to the second inlet of the outlet manifold to form at least one second circuit within the heat absorbing or dissipating body,
wherein the at least one first and second circuits are configured in a way such that any thermal conductive fluid is flowable in the heat absorbing or dissipating body such that the flow through the at least one first circuit is in one direction and the flow in the at least one second circuit is in a parallel and opposite direction to the one direction.

2. The heat absorbing or dissipating device as claimed in claim 1, wherein the first outlet of the inlet manifold is configured in a way such that the first outlet is located in a first position adjacent to the second inlet of the outlet manifold and the second outlet of the inlet manifold is configured in a way such that the second outlet is located in a second position adjacent to the first inlet of the outlet manifold.

3. The heat absorbing or dissipating device as claimed in claim 1, wherein the at least one first fluid piping and the at least one second fluid piping can be integrally formed with the heat absorbing or dissipating body.

4. The heat absorbing or dissipating device as claimed in claim 1, wherein the at least one first fluid piping and the at least one second fluid piping can be formed with the heat absorbing or dissipating body as an assembled structure.

5. The heat absorbing or dissipating device as claimed in claim 1, wherein the heat absorbing or dissipating body can be formed from at least one single structural body selected from the group consisting of a plate, a block, multi-fin structure, and a structural unit assembled with fins.

6. The heat absorbing or dissipating device as claimed in claim 1, wherein the at least one first fluid piping, the at least one second fluid piping, or the heat absorbing or dissipating body, or combinations thereof can be formed into various geometric shapes.

7. The heat absorbing or dissipating device as claimed in claim 1, wherein the thermal conductive fluid is a gaseous or liquid state fluid, or changes phases from a gas to a liquid fluid, or liquid fluid to gas.

8. The heat absorbing or dissipating device as claimed in claim 1, wherein the thermal conductive fluid flows through the at least one first fluid piping and the at least one second fluid piping by pumping, evaporation, or heat-cold natural circulation.

9. The heat absorbing or dissipating device as claimed in claim 1, wherein the heat transference to the passively heat dissipation or absorption receiving article or space is through cold-heat natural circulation of the thermal conductive fluid having a temperature difference or forced fluid pumping to generate thermal transference of heat by heat convention, radiation or conduction.

10. The heat absorbing or dissipating device as claimed in claim 1, wherein the thermal conductive fluid passing through the at least one first fluid piping and the at least one second fluid piping flows in a closed-loop or open-loop system.

11. The heat absorbing or dissipating device according to claim 1, wherein the heat absorbing or dissipating device is configured to transfer heat to the thermal conductive fluids from the passive heat dissipating or absorption receiving article so that a more uniform temperature distribution occurs within the passive heat dissipation or absorption receiving article or space.

12. The heat absorbing or dissipating device as recited in claim 1, wherein the flow through the at least one first circuit and flow through the at least one second circuit is parallel and opposite in immediately adjacent sections in the at least one first circuit and the at least one second circuit.

* * * * *